R. LLOYD.
Car-Bumpers.
No. 150,249.
Patented April 28, 1874.
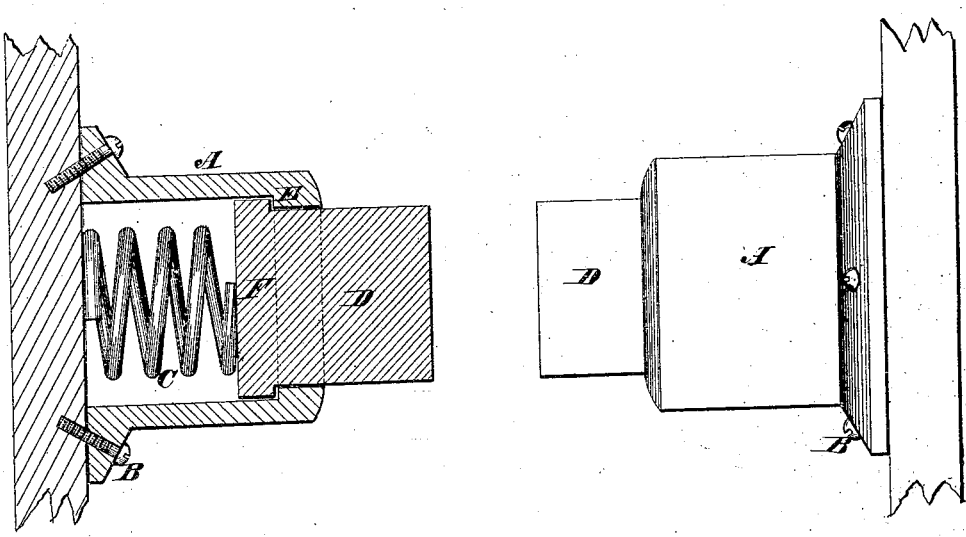
WITNESSES:
INVENTOR:
BY
ATTORNEYS.

UNITED STATES PATENT OFFICE.

RICHARD LLOYD, OF CLEVELAND, OHIO.

IMPROVEMENT IN CAR-BUMPERS.

Specification forming part of Letters Patent No. 150,249, dated April 28, 1874; application filed January 31, 1874.

*To all whom it may concern:*

Be it known that I, RICHARD LLOYD, of Cleveland, in the county of Cuyahoga and State of Ohio, have invented a new and useful Improvement in Rail-Car Bumpers, of which the following is a specification:

The object of this invention is to furnish a bumper for railroad-cars, which shall be more durable and elastic than those now in use; and it consists in a metallic casing or shell attached to the car, containing a spiral or rubber spring and a bumper-block confined therein by shoulders and in contact with the spring.

The accompanying drawing gives an outside view, and a longitudinal section, of my improved bumper.

Similar letters of reference indicate corresponding parts.

A is a shell of cast-iron surrounded by a flange, B, by means of which it is bolted to the timber of the car-truck. C is a spiral or rubber spring, and D is the bumper-block. The interior surface of the shell is provided with a shoulder, E. F is the head of the bumper-block, which projects sufficiently to engage with the shoulder E. The head and the shoulder E are held in contact with each other by the spring, except when the cars come together; then the spring is compressed. The two bumpers thus coming in contact prevent the violent concussion and jar so disagreeable to passengers and so destructive to the rolling-stock of the road.

The shell and block may be in any form and of any size.

The bumper is very simple, cheap, and durable, and may be applied to any car with the greatest ease.

Having thus described my invention, I claim as new and desire to secure by Letters Patent—

The combination of the shell A, having shoulders B E, the bumper D, having head F, and the spring C, as and for the purpose described.

RICHARD LLOYD.

Witnesses:
 N. TOVAT,
 JOHN BREEN.